(12) United States Patent
Waggoner

(10) Patent No.: US 10,513,590 B2
(45) Date of Patent: Dec. 24, 2019

(54) REDUCED DENSITY THERMOPLASTICS

(71) Applicant: Corumat, Inc., Pomona, CA (US)

(72) Inventor: Michael Waggoner, Seattle, WA (US)

(73) Assignee: Corumat, Inc., Pomona, CA (US)

( * ) Notice: Subject to any disclaimer, the term of this patent is extended or adjusted under 35 U.S.C. 154(b) by 0 days.

(21) Appl. No.: 14/308,959

(22) Filed: Jun. 19, 2014

(65) Prior Publication Data

US 2014/0377530 A1 Dec. 25, 2014

Related U.S. Application Data

(60) Provisional application No. 61/837,110, filed on Jun. 19, 2013.

(51) Int. Cl.
*B29C 44/02* (2006.01)
*C08J 9/34* (2006.01)
(Continued)

(52) U.S. Cl.
CPC ............. *C08J 9/34* (2013.01); *B29C 44/02* (2013.01); *B29C 44/022* (2013.01);
(Continued)

(58) Field of Classification Search
CPC ............ B29C 44/3453; B29C 44/0461; B29C 51/264; B29C 51/426; B29C 51/422; B29C 51/10; B29C 44/022; B29C 44/02; B29C 44/60; B29C 51/428; B29C 44/352; B29C 44/34; B29C 44/355; B29C 44/50; B29C 44/505; B29C 44/3402; B29C 44/3403; Y10S 264/13; Y10S 264/14; Y10S 264/16; Y10S 264/17; Y10S 264/18; Y10S 264/28; Y10S 425/237; Y10S 435/812; C08J 2203/182; C08J 2203/06; C08J 2300/16; C08J 2329/04; C08J 9/149;
(Continued)

(56) References Cited

U.S. PATENT DOCUMENTS 3,651,183 A * 3/1972 Hosoda et al. ........ C08J 9/0061
264/54
3,883,625 A 5/1975 Thomas et al.
(Continued)

FOREIGN PATENT DOCUMENTS

EP 14 81 4566 1/2017
JP 10235668 A * 9/1998
(Continued)

OTHER PUBLICATIONS

NPL-1. Materials Safety Data Sheet for Polylactic Acid. Jul. 7, 2008.*
(Continued)

*Primary Examiner* — Leith S Shafi

(57) ABSTRACT

The instant application discloses, among other things, ways to manufacture reduced density thermoplastics. A rapid foaming process which may create a polymer product by saturating thermoplastic sheet or preforms, heating, and then forming into final shape, is described. The polymer product may include an integral solid skin. This method may be utilized with any thermoplastic. The material handling, saturation methods, and end products are also described.

35 Claims, 12 Drawing Sheets

(51) Int. Cl.
  B29C 44/34 (2006.01)
  B29C 44/60 (2006.01)
  B29C 51/42 (2006.01)
  B29C 51/46 (2006.01)
  B32B 5/20 (2006.01)
  B29C 51/02 (2006.01)
  B29C 51/26 (2006.01)
  B29K 67/00 (2006.01)
  B29K 105/04 (2006.01)
  B29K 105/00 (2006.01)
  B29K 105/26 (2006.01)
  B29B 11/02 (2006.01)
  B29B 11/08 (2006.01)
  B29C 51/10 (2006.01)
  B29K 23/00 (2006.01)
  B29L 9/00 (2006.01)

(52) U.S. Cl.
  CPC ............ B29C 44/352 (2013.01); B29C 44/60 (2013.01); B29C 51/428 (2013.01); B29C 51/46 (2013.01); B32B 5/20 (2013.01); B29B 11/02 (2013.01); B29B 11/08 (2013.01); B29C 51/02 (2013.01); B29C 51/10 (2013.01); B29C 51/264 (2013.01); B29C 51/426 (2013.01); B29K 2023/086 (2013.01); B29K 2067/046 (2013.01); B29K 2105/0085 (2013.01); B29K 2105/04 (2013.01); B29K 2105/041 (2013.01); B29K 2105/256 (2013.01); B29K 2105/26 (2013.01); B29L 2009/00 (2013.01); B32B 2553/00 (2013.01); C08J 2367/04 (2013.01); Y10T 428/24992 (2015.01); Y10T 428/249953 (2015.04); Y10T 428/249981 (2015.04)

(58) Field of Classification Search
  CPC .. C08J 2203/202; C08J 2203/10; C08J 11/14; C08J 2367/04; C08J 2205/048; C08J 2203/02; C08J 2201/0484; C08J 2201/0504; C08J 2201/0524; C08J 2201/0544; C08J 2201/0547; C08J 2201/032; C07C 51/09; C07C 59/08; C07C 69/68
  USPC ............................ 264/320, 37.3, 50, 321, 41
  See application file for complete search history.

(56) References Cited

U.S. PATENT DOCUMENTS

| | | | | |
|---|---|---|---|---|
| 4,455,272 | A | * | 6/1984 | Schubert ............ B29C 44/3442 264/53 |
| 5,444,113 | A | | 8/1995 | Sinclair et al. |
| 5,723,510 | A | | 3/1998 | Kabumoto et al. |
| 5,866,053 | A | * | 2/1999 | Park ....................... B29C 44/348 264/50 |
| 6,232,354 | B1 | | 5/2001 | Tan |
| 7,670,545 | B2 | | 3/2010 | Bopp et al. |
| 8,080,194 | B2 | * | 12/2011 | Nadella ............... B29C 44/3446 264/102 |
| 8,377,548 | B2 | | 2/2013 | Nadella et al. |
| 8,858,849 | B2 | | 10/2014 | Nadella et al. |
| 8,877,331 | B2 | | 11/2014 | Nadella et al. |
| 8,926,876 | B2 | | 1/2015 | Kumar et al. |
| 9,770,854 | B2 | | 9/2017 | Branch |
| 2007/0148384 | A1 | | 6/2007 | Bowden et al. |
| 2007/0179253 | A1 | * | 8/2007 | Matsuoka ............... C08L 67/04 525/438 |
| 2009/0104420 | A1 | | 4/2009 | Nadella et al. |
| 2009/0309250 | A1 | | 12/2009 | Nadella et al. |
| 2010/0052201 | A1 | * | 3/2010 | Nadella ................. B29C 44/348 264/50 |
| 2010/0062235 | A1 | | 3/2010 | Nadella et al. |
| 2010/0086758 | A1 | | 4/2010 | Takase et al. |
| 2010/0136338 | A1 | | 6/2010 | Hiarai et al. |
| 2010/0297416 | A1 | * | 11/2010 | Kumar ..................... B32B 27/08 428/220 |
| 2011/0003133 | A1 | | 1/2011 | Kumar et al. |
| 2012/0225961 | A1 | * | 9/2012 | Van Horn ................ C08J 9/127 521/97 |
| 2013/0303643 | A1 | | 11/2013 | Nadella et al. |
| 2013/0303645 | A1 | | 11/2013 | Dix et al. |
| 2016/0045879 | A1 | | 2/2016 | Kumar et al. |
| 2016/0121577 | A1 | | 5/2016 | Waggoner |
| 2016/0122489 | A1 | | 5/2016 | Waggoner |

FOREIGN PATENT DOCUMENTS

| | | |
|---|---|---|
| JP | 2006-044726 A | 2/2006 |
| WO | WO 2014/205180 A3 | 12/2014 |

OTHER PUBLICATIONS

Machine Translated JP H10-235668.*
Cha, Sung Woon. A microcellular foaming/forming process performed at ambient temperature and a super-microcelluar foaming process. Diss. Massachusetts Institute of Technology, 1994.
Third Party Submission Under 37 CFR 1.290 filed Apr. 12, 2018 for U.S. Appl. No. 14/930,592, 19 pages.
Non-Final Office Action dated Aug. 7, 2018 for U.S. Appl. No. 14/930,592, 20 pages.
"The Ideal Gas Law" by University of Waterloo; accessed at http://www.science.uwaterloo.ca/~cchieh/cact/c120/idealgas.html via Wayback Machine; 2004, 1 page.
Wang, X. et al., "Development of Crystallization in PLA During Solid-State Foaming Process Using Sub-Critical $CO_2$," Cellular Polymers, vol. 31, No. 1, pp. 1-18 (2012).
Non-Final Office Action dated Dec. 26, 2018 for U.S. Appl. No. 14/930,610, 12 pages.

* cited by examiner

REDUCED DENSITY THERMOPLASTICS

CROSS REFERENCE TO RELATED APPLICATIONS

This application claims priority to and the benefit of U.S. Provisional Application No. 61/837,110, filed Jun. 19, 2013, the disclosure of which is hereby incorporated by reference in its entirety.

FIELD

This disclosure relates generally to Reduced Density Thermoplastics structures produced through solid state foaming.

BACKGROUND

Plastics are widely used in both durable and non-durable applications. The majority of non-durable plastics are used in initial packaging of goods and food service packaging, often in single use applications.

The disposal of plastic products results in huge amounts of waste. Recyclable plastic products must be cleaned before recycling, which consumes additional energy. Due to incomplete cleaning and degradation of the polymers during processing they are often unable to be recycled into similar quality goods.

Foam plastic products produced through conventional means utilizing a chemical blowing agent solve some of the problems of solid plastic products by adding insulation and cushioning to their benefits, but often create new problems. Foamed plastic may become friable, and form small pellets nearly impossible to separate from a waste stream. The surface of foamed plastics is often cellular and unattractive to consumers.

The chemical blowing agents, fluorocarbons and chlorofluorocarbons, used in producing many foams have negative environmental effects, and the contamination of plastics from these blowing agents may render them non-recyclable.

Solid state foaming utilizing carbon dioxide, or other high pressure gas, as a foaming agent has been explored as a resolution to some of the above problems. Semi-continuous foaming is a method of interleaving a saturated roll of polymer with a gas-channeling means, which allows saturation of polymers prior to thermoforming. Semi-continuous production is a labor intensive process which consumes an interleaving layer and requires a large amount of plastic. Plastic loses gas during processing, and a large roll of plastic may take a long time to process, so the properties at the start of a foam roll may differ from those of the end of a roll.

The problems concerning the utilization of plastics in packaging, in both foam and solid form, extend to durable goods as well. A particular area of plastic usage for durable goods is composites, in which multiple phase separated materials are bonded together to create a single part with better properties. The center section of these parts are often foam. Most foams produced for these applications cannot be recycled after bonding, and are not biodegradable.

SUMMARY

The instant application discloses, among other things, reduced density thermoplastics. A rapid foaming process which may create a polymer product which may include an integral solid skin by saturating thermoplastic sheet or preforms, heating, and then forming into final shape, is described. This method may be utilized with any thermoplastic. The material handling, saturation methods, and end products are unique and also described. Utilizing these methods with compostable Polylactic Acid (PLA) or a blend may result in low density, high strength compostable structures.

DETAILED DESCRIPTION

Figure 1:
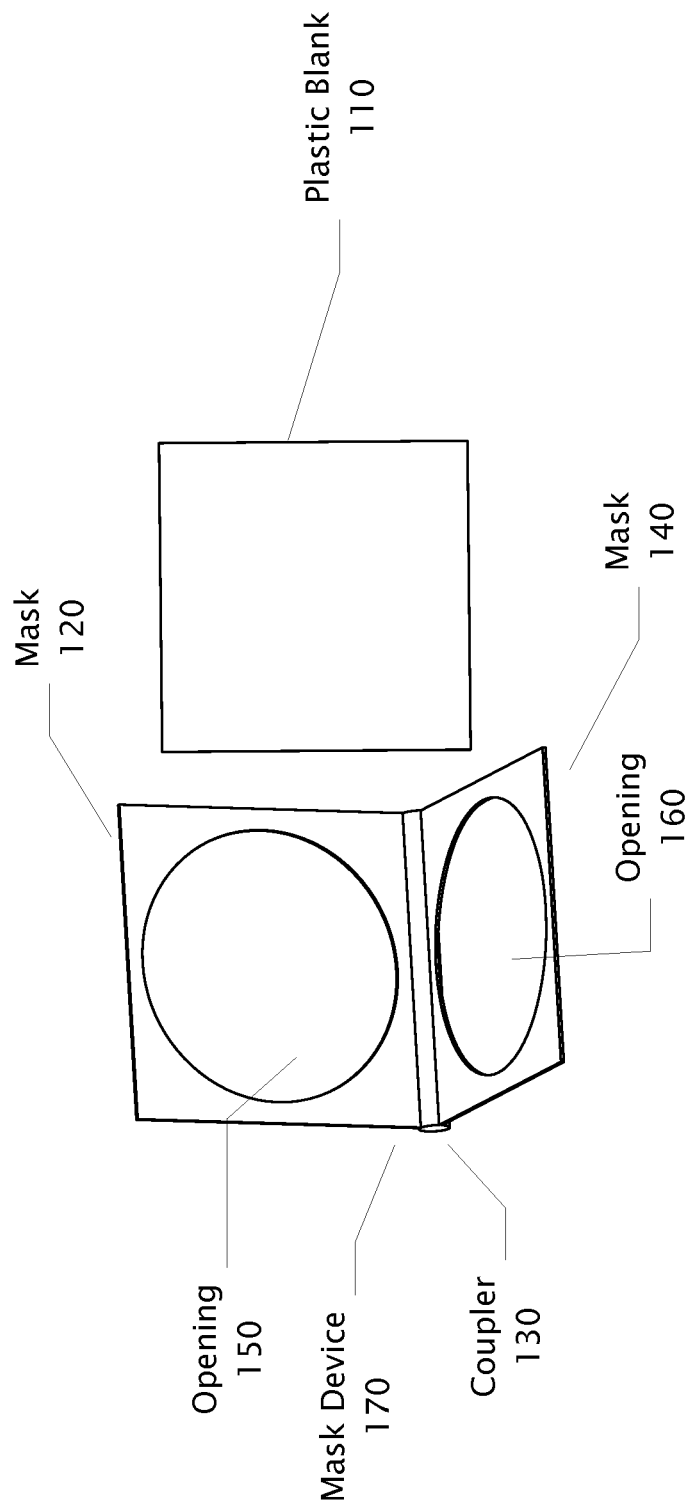
FIG. 1 illustrates a plastic blank and a mask device, according to one embodiment.

A more particular description of certain embodiments of Reduced Density Thermoplastics may be had by references to the embodiments described below, and those shown in the drawings that form a part of this specification, in which like numerals represent like objects.

In one embodiment, a set of plastic blanks may be created by either cutting from a roll of plastic or by injection molding of the shapes. Each blank may be shaped in such a manner that it provides the material for a small number of parts, such as one to 100. The blanks, which may be of any shape or size, may then be loaded into a rack for ease of saturation. The rack may then be loaded into a pressure vessel for saturation. The plastic may be allowed to saturate partially or fully, possibly resulting in a high gas concentration at the surface of the blanks. The blanks may then be removed, and the plastic may be transferred into a heating rack. The heating rack may be fed through a conventional thermoformer, where the blanks may be heated and stretched into shape. During heating and stretching, a solid state foam structure may be created.

A variation of the above embodiment is to injection mold blanks instead of extruding them. Injection molded parts may be formed of varying thickness, allowing different levels of saturation and the parts may be shaped in such a manner as to require little post-forming after heating. The injection molded parts may also be directly molded into a pressure vessel and allowed to cool, eliminating the need for saturation time.

FIG. 1 illustrates Plastic Blank 110 and Mask Device 170, according to one embodiment. Mask 120 and Mask 140 may be coupled by Coupler 130 to form Mask Device 170. Coupler 130 may be a hinge, one or more clips, a bend in the material forming Mask 120 and Mask 140, or other means to couple them. Plastic Blank 110 may be placed between Mask 120 and Mask 140, which may fold at Coupler 130 to seal Plastic Blank 110 in Mask Device 170. Plastic Blank 110 may be any type of thermoforming plastic.

Mask 120 may have an opening 150, and Mask 140 may have an Opening 160, which may allow portions of Plastic Blank 110 covered by Mask 120 and Mask 140 to be exposed to a gas foaming agent, while protecting other portions of Plastic Blank 110 from the gas foaming agent.

One having skill in the art will recognize that various ways of masking plastic blanks may be used, and that masks may have different sizes and shapes. Mask device may also be configured to hold several plastic blanks at the same time.

Figure 2:
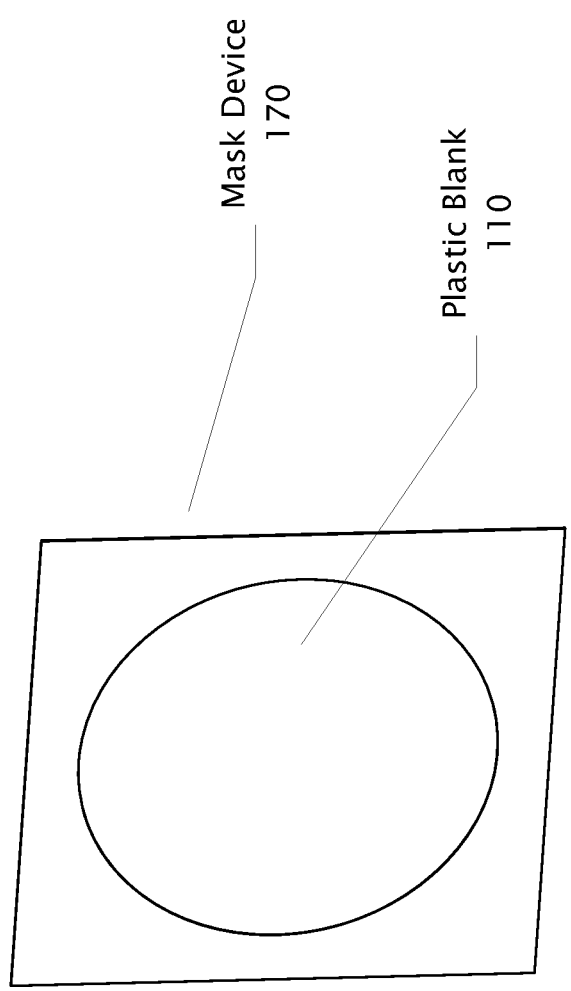
FIG. 2 illustrates a plastic blank closed in a mask, according to one embodiment.

FIG. 2 illustrates a plastic blank enclosed in Mask Device 170, according to one embodiment. Mask Device 170 may close tightly against Plastic Blank 110, forming a gas-proof or near gas-proof seal.

Mask Device 170 may have sufficient thermal shielding to prevent masked portions of Plastic Blank 110 from becoming heated enough to foam if Mask Device 170 is used during heating.

Figure 3:
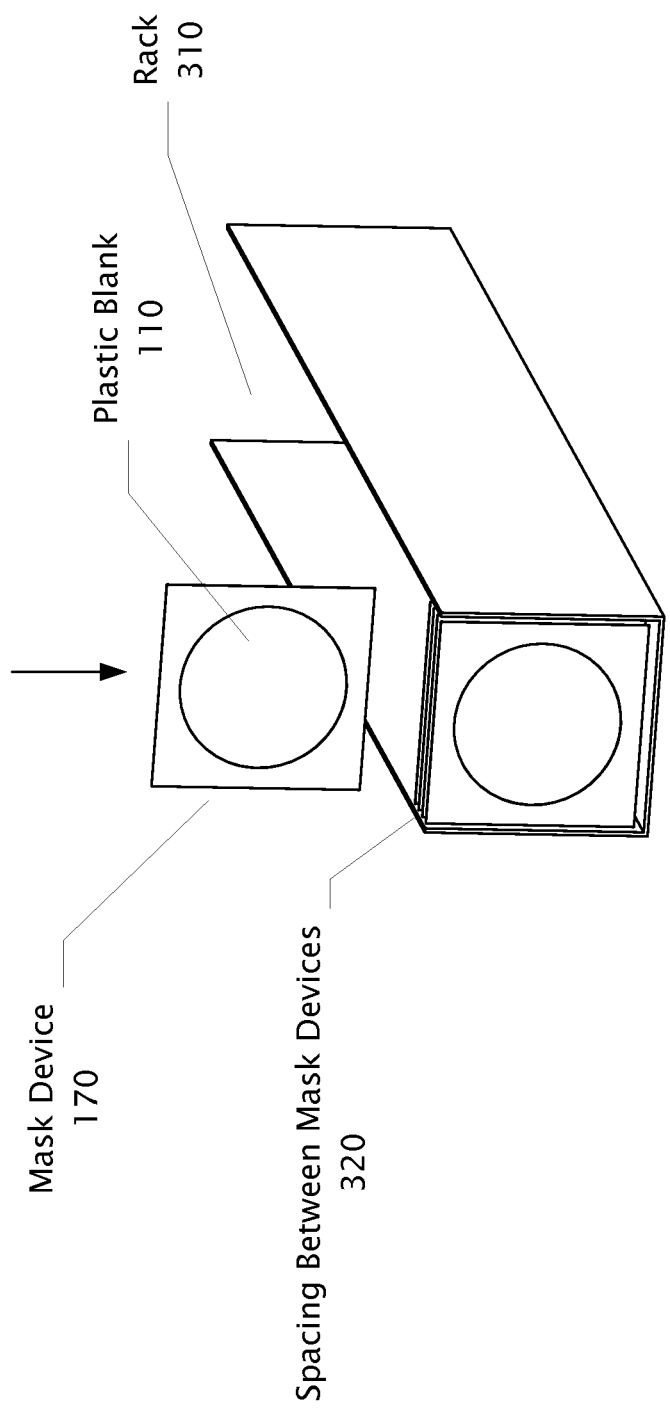
FIG. 3 illustrates placing a mask holding a plastic blank into a rack, according to one embodiment.

FIG. 3 illustrates placing Mask Device 170 holding Plastic Blank 110 into Rack 310, according to one embodiment. Rack 310 may be configured to hold multiple Mask Devices 170, with Spacing Between Mask Devices 320 sufficient to allow Plastic Blank 110 to be exposed to a gas foaming agent.

Figure 4:
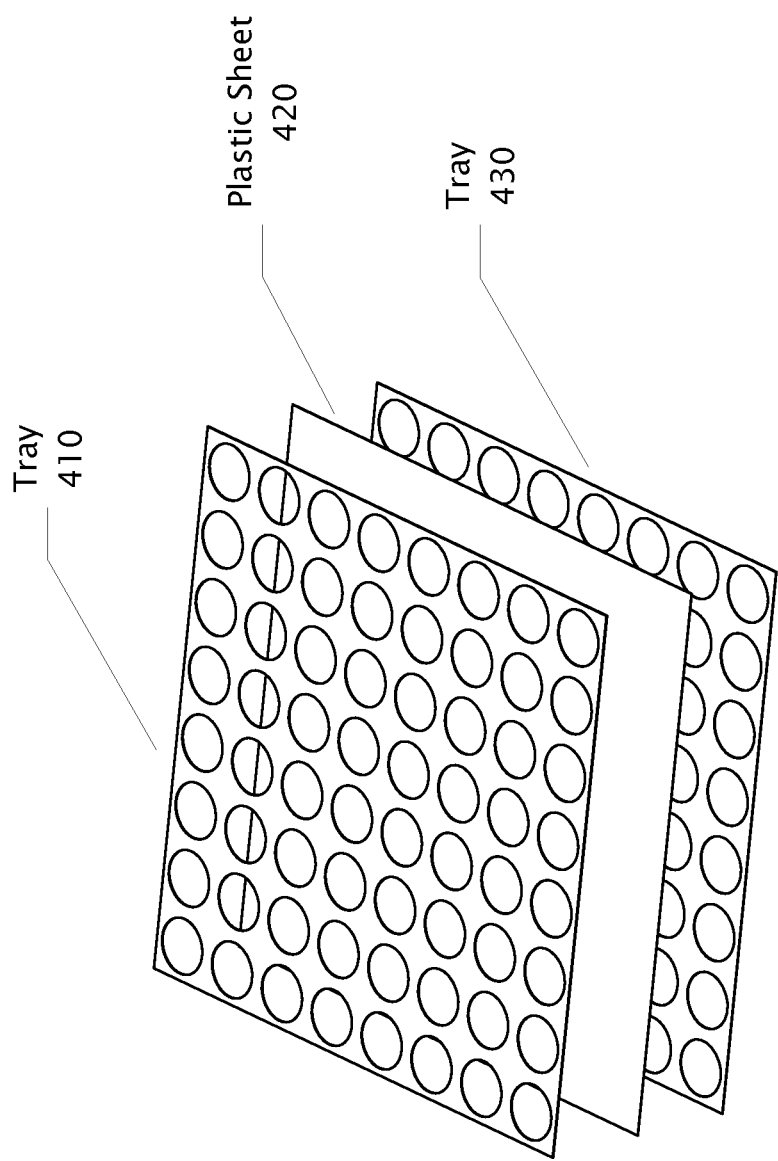
FIG. 4 illustrates a plastic sheet and mask according to one embodiment.

FIG. 4 illustrates a plastic sheet and mask according to one embodiment. Large Plastic Sheet 420 from which many parts may be formed, may be loaded into saturating and heating Trays 410, 430. Trays 410, 430, (serving as masks) may contain a plurality of holes, the shape of which is similar to the exterior profile of a plastic part to be formed, for example, round for a cup or square for a tray. The Plastic Sheet 420 may then be loaded into a pressure vessel and saturated for a period of time. The holes present in the trays may allow the plastic sheet to be saturated in areas in which plastic parts will be formed. The plastic may then be removed from the pressure vessel, heated, and formed using conventional thermoforming equipment. The plastic may be transported through the thermoforming machinery utilizing the same masking tray as was utilized for saturation or a different masking tray. It may also be desirable to eliminate the use of trays in the saturation process, and use rails on the side of the pressure vessel and forming equipment to transport the plastic without the use of trays.

Figure 5:
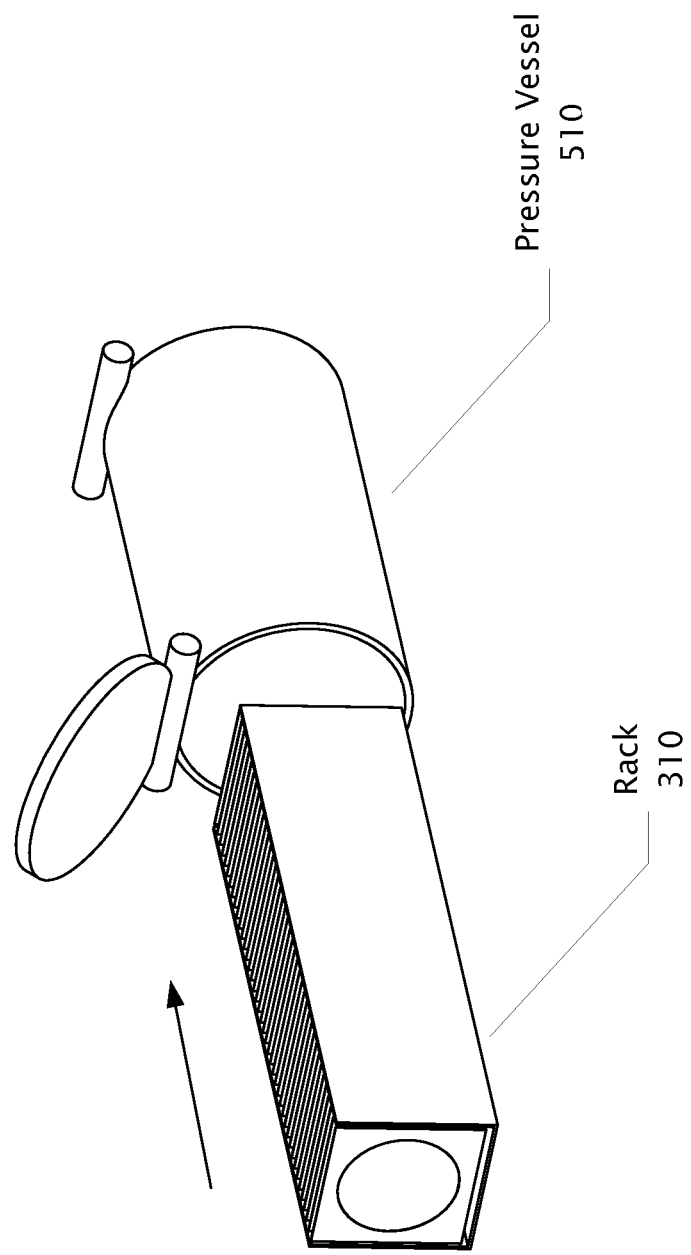
FIG. 5 illustrates a rack being placed into a pressure vessel, according to one embodiment.

FIG. 5 illustrates Rack 310 being placed into Pressure Vessel 510, according to one embodiment. Rack 310 may hold at least one Mask Device 170 with Plastic Blank 110. Pressure Vessel 510 may be pressurized, to allow a gas foaming agent to penetrate exposed portions of Plastic Blank 110.

In another embodiment, sheet may be extruded directly into a pressure vessel. The extruded sheet may be allowed to cool into the pressure vessel, and loaded into racks. This variation eliminates the need for saturation time.

In yet another embodiment, gate-style valves and pressure locks may be used at the inlet and exit to all pressure vessels, and a conveyance system may be configured within the pressure vessel. The pressure locks may allow sheet, blanks, or preforms to enter a pressure vessel which contains other plastic. A material conveyance system within the pressure vessel may move items through the pressure vessel. All materials in this arrangement may receive precisely the same amount of time in the pressure vessel.

Various parameters such as temperature, pressure, gas foaming agent, and timing, may be adjusted to provide various characteristics of resulting foamed plastic. Saturation time and desorption time variations have been shown to be able to produce novel structures within the polymer. Higher gas concentration can lead to increases in crystallinity, and also to increases in bubble nucleation rates. Lower gas concentrations can lead to increases in density reduction. Combining these two elements can result in parts with high density exteriors and low density interiors, a structure that leads to optimal mechanical properties for a given part weight.

It may be desirable to add a solvent to the pressure vessel during the saturation process. When saturating PLA, it has been found that water induces a change in the surface of the sheet, creating a uniform white surface during heating. When saturating PET, it has been found that acetone will induce crystallization on the surface of the part.

Controlled heating of the plastic may be used to induce specific properties in foam parts. Heating a single side of the plastic sheet may cause an asymmetric density and foam cell distribution. Asymmetric density may optimize mechanical properties, such as creating a cup that is resistant to external crushing forces while bending outward easily for removal from a stack. Colorant usage may be optimized by creating a colored, high density exterior (colorants are dispersed by reducing density) while minimizing density in the remainder of the part.

It may be advantageous to partially distort the plastic blanks, or plastic exposed in holes during heating. This may be done to increase the uniformity of heating, or begin stretching into shape before beginning final shape stretching into a mold. This may be performed by increasing air pressure on one side of the sheets, decreasing air pressures on one side of the sheets, utilizing high pressure air jets, or by inducing stretching by direct mechanical force through the use of temperature controlled plugs.

Upon completion of the foaming operation, Rack 310 may be removed from Pressure Vessel, and Mask Device 170 may be extracted.

Plastic Blank 110 may then be heated through a thermoforming machine. Plastic Blank 110 may be held by rack or chain rails until heated. Portions of Plastic Blank 110 exposed by the mask may become foamed while portions protected by the mask may remain unfoamed.

For some products, Plastic Blank 110 may be pushed into a mold using, for example, a mechanical plug. Plastic Blank may be formed into a final desired shape using vacuum (reduced pressure), positive pressure, mechanical coercion, or combinations of these techniques.

For example, Plastic Blank 110 may be moved via a material conveyance system until it is over a mold to form a drinking cup. A clamp ring which may aid in the forming of a lip may hold Plastic Blank 110 in the proper position as an upper portion of a mold lowers to hold Plastic Blank 110 in place. Positive pressure may be applied from the top, while vacuum may pull Plastic Blank 110 into the mold. The mold may allow a lip to be formed where the top and bottom of the mold hold Plastic Blank 110 securely in place.

Figure 6:
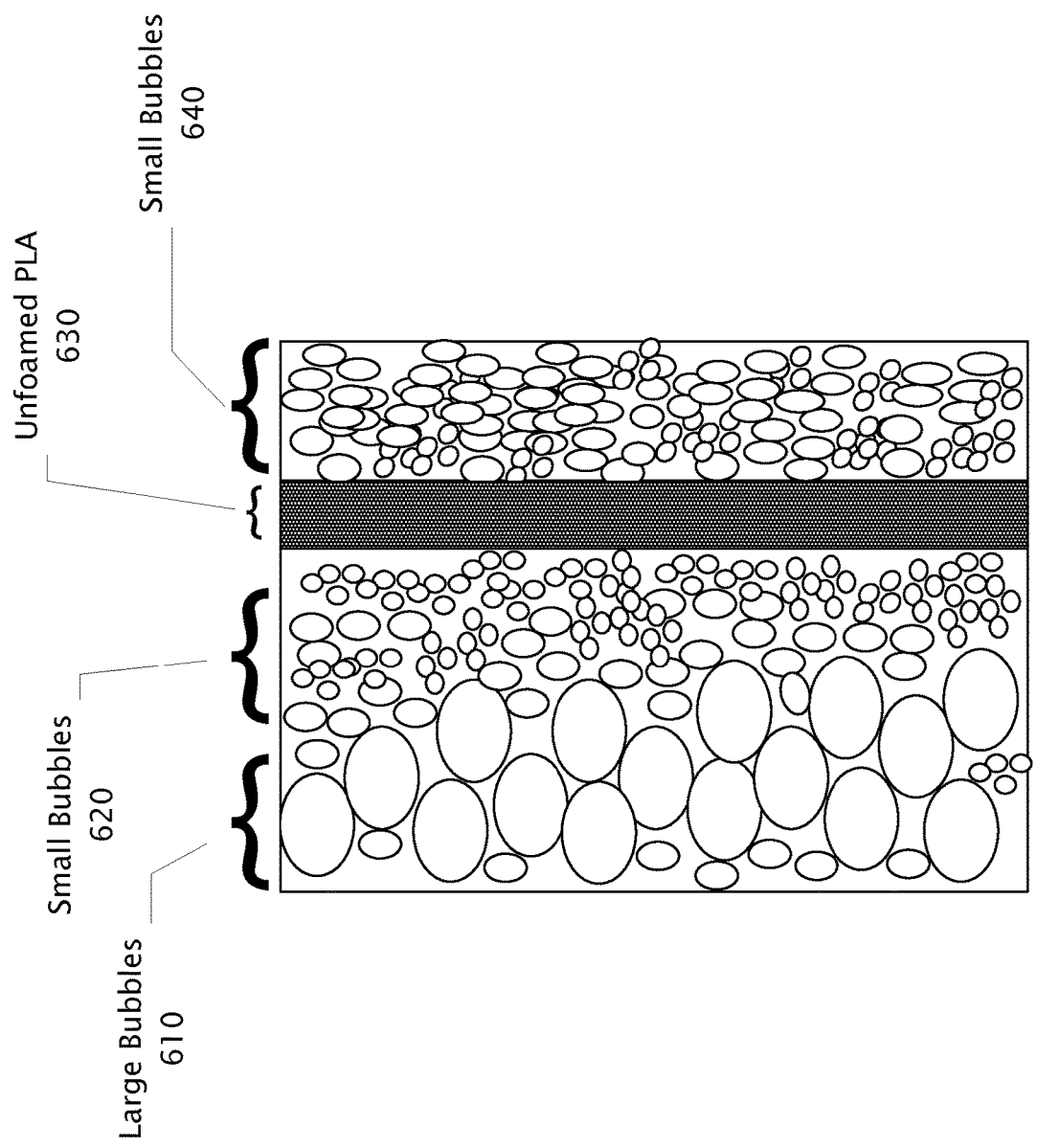
FIG. 6 illustrates one example of a cross-section of a plastic blank after foaming, according to one embodiment.

FIG. 6 illustrates an example of a cross-section of a plastic blank after foaming, according to one embodiment. In this example, pressure, temperature, timing, and gas foaming agent selections have produced a plastic with Large Bubbles 610 near one side of the cross-section, with Small Bubbles 620 adjacent to Large Bubbles 610, and Small Bubbles 540 near an opposite side. Between Small Bubbles 620 and Small Bubbles 640 is Unfoamed Polylactic Acid (PLA) 630. This example illustrates the results of heat applied at a higher rate on one side than the other during thermoforming.

Figure 7:
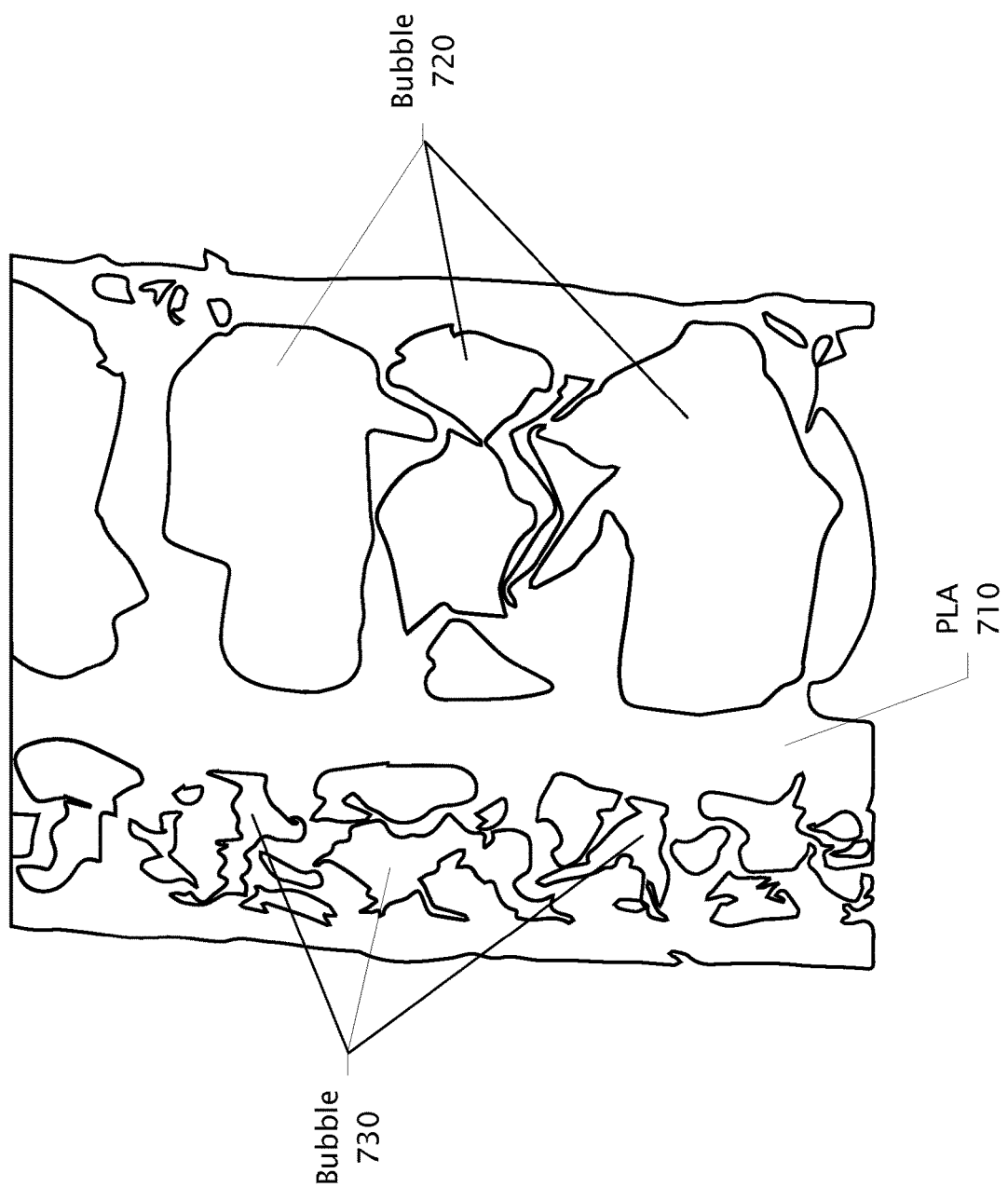
FIG. 7 illustrates one example of a cross-section of a plastic blank after foaming, according to another embodiment.

FIG. 7 illustrates an example of a cross-section of a plastic blank after foaming, according to another embodiment. In this simplified scanning electron microscope image of a sample, Large Bubbles 720 start near one side and extend to near the center of the blank. PLA 710 may be unfoamed, while smaller Bubbles 630 are near an opposite side from Bubbles 720.

Figure 8:
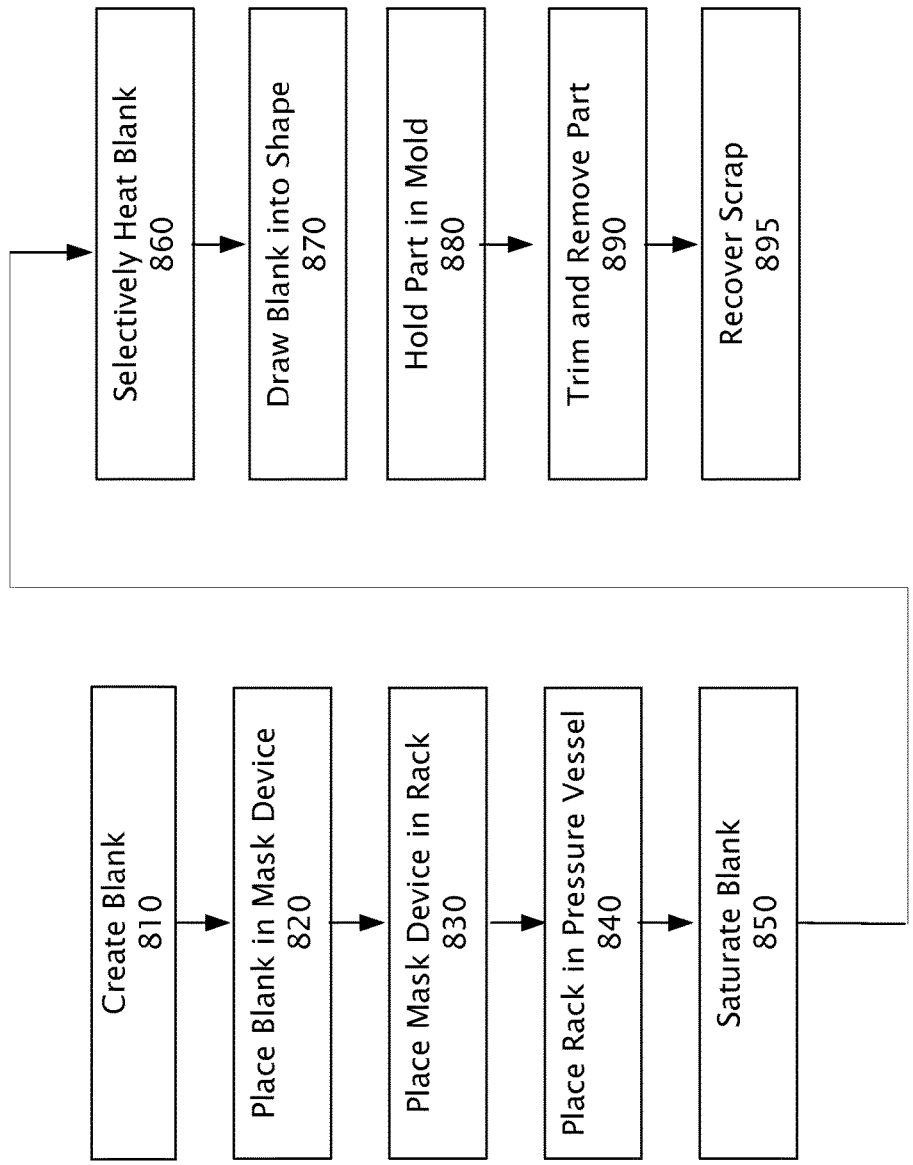
FIG. 8 is a flow chart of creating a reduced density thermoplastics product, according to one embodiment.

FIG. 8 is a flow chart of creating a PLA product, according to one embodiment. Create Blank 810 may include cutting a blank from a sheet, extruding a sheet, or other ways to obtain a suitable blank of plastic. For Place Blank in Mask Device 820, the Mask Device may be configured to allow a gas foaming agent or heat to be exposed to portions and not exposed to others portions of the blank. Place Mask Device in Rack 830 may allow for multiple blanks to be processed at a time. In other embodiments, racks may not be required. Place Rack in Pressure Vessel 840 may be a manual or automated process, moving the rack to a position where Saturate Blank 850 may occur. Saturation parameters may include gas foam-agent used, pressure, temperature, and time. Varying these parameters may provide reduced density thermoplastics with differing properties, including strength, insulation value, and flexibility. The rack may be removed from the pressure vessel, and mask devices may be removed from a rack, if one was used. Selectively Heat Blank 860 may allow exposed portions of the blank to be heated in a thermoformer. By masking portions of the blank, heating and foaming may be restricted to what is required for the desired product. Edges of the blank may be constrained to prevent the blank from warping, and may facilitate Draw Blank into Shape 870. Draw Blank into Shape 870 may use pressure and vacuum to cause the blank to conform to a mold. Hold Part in Mold 880 may allow the part to cool and retain a shape. Trim and Remove Part 890 may include trimming excess material and removing the part from the mold. At Recover Scrap 895, portions of the blank that were not exposed to gas foaming agent and heat may then be reused to create another blank.

Figure 9:
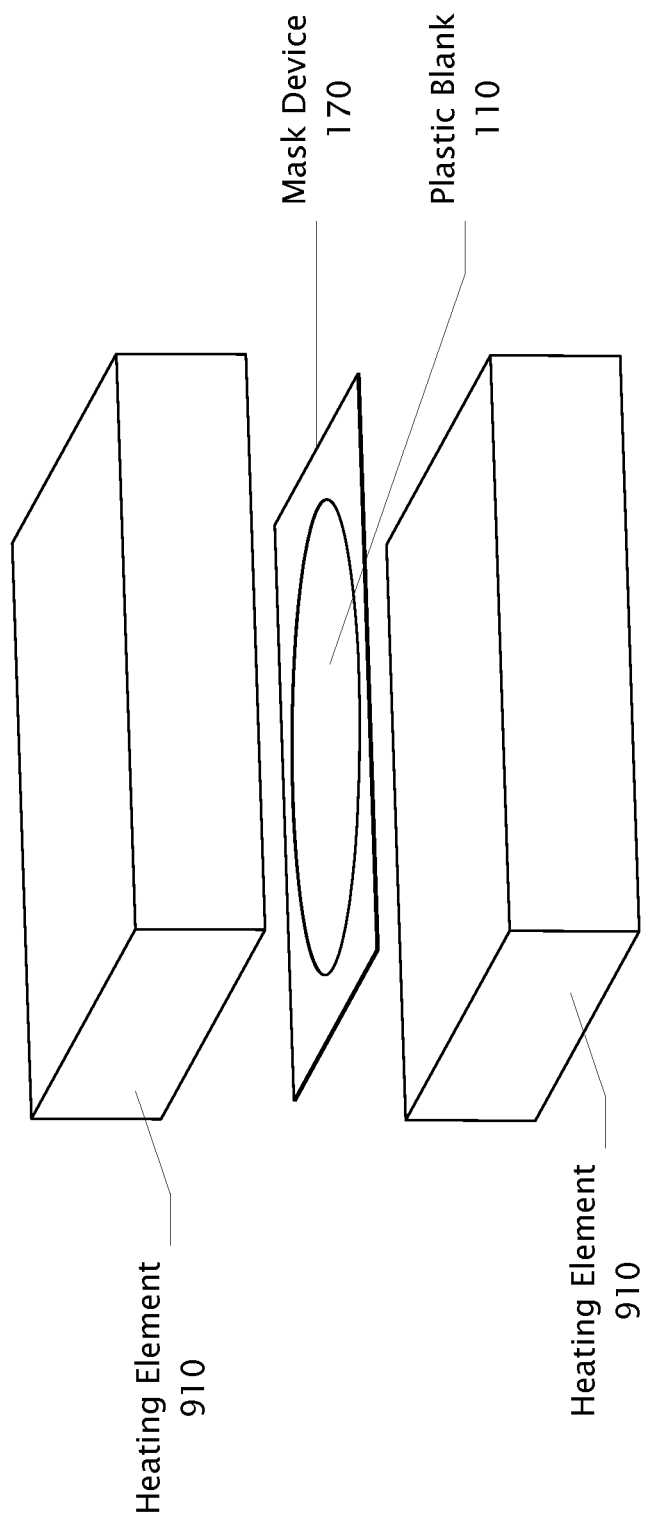
FIG. 9 illustrates the placement of a plastic blank in a rack between 2 heating elements.

FIG. 9 is an image showing Plastic Blank 110 in Mask Device 170, placed between two Heating Elements 910. Heating Elements 910 may be radiative, conductive, or convective heating elements. By changing the relative temperature of these heating elements, asymmetric heat can be applied to each side of Plastic Blank 110.

Figure 10:
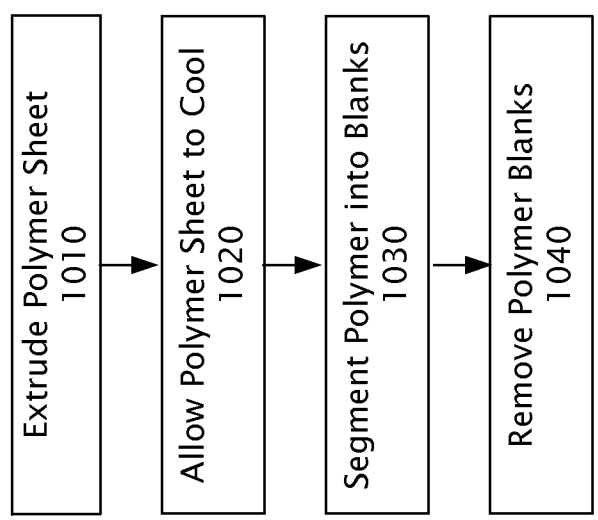
FIG. 10 is a flow chart for extruding plastic sheet directly into a pressure vessel.

FIG. 10 is a flow chart for extruding plastic sheet directly into a pressure vessel. Extrude Polymer Sheet into Pressure Vessel 1010 may provide a polymer sheet from which to create the saturated sheets. Allow Polymer Sheet to Cool 1020 may include reducing temperature inside the pressure vessel. Segment Polymer into Sheets 1030 may include cutting the sheet into appropriate sizes for an intended product. The resulting polymer sheets may be Removed 1040 through a series of pressure locks, which may allow the pressure inside the pressure vessel to be maintained.

Figure 11:
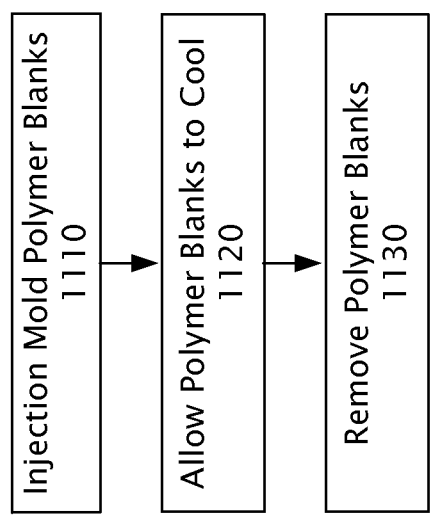
FIG. 11 is a flow chart for injection molding polymer blanks directly into a pressure vessel.

FIG. 11 is a flow chart for injection molding polymer blanks directly into a pressure vessel. Injection Mold Polymer Blanks into Pressure Vessel 1110 may provide polymer blanks from which to create the saturated blanks. Allow Polymer Blanks to Cool 1020 may include reducing temperature inside the pressure vessel. The resulting saturated Polymer Blanks may be Removed 1130 through a series of pressure locks, which may allow the pressure inside the pressure vessel to be maintained.

Figure 12:
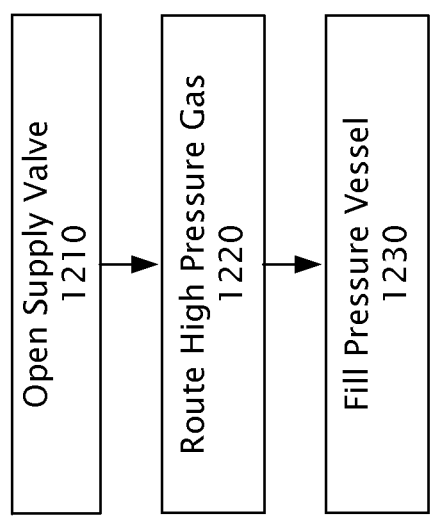
FIG. 12 is a flow chart of introducing solvent into a pressure vessel.

FIG. 12 is a flow chart of introducing solvent into a pressure vessel. In this example, a Supply Valve for a high pressure gas source may be Opened 1210. The High Pressure Gas may be Routed 1220 through a porous membrane saturated with solvent, or past a nozzle ejecting solvent. The high pressure gas containing solvent may then Fill Pressure Vessel 1230.

Example Parameters

The following conditions have been used to produce a drinking cup. A sheet of Natureworks 4032D, 0.024 inches in thickness, may be saturated in a $CO_2$ pressure vessel for 10 minutes, at a pressure of 600 pounds per square inch (PSI), with water vapor introduced during the fill cycle of the pressure vessel. The sheet was allowed to lose gas for 5 minutes prior (desorption time) to heating and stretching, and then heated while constrained within 0.2 inches of the cup perimeter until reaching approximately 90 degrees Celsius. The sheet may then be forced into a cup mold using an aluminum plug at 7 degrees Celsius, and set against a cup mold at 110 degrees Celsius for 15 seconds.

Pressure ranges from 400-1000 PSI for PLA and saturation times of 5 to 45 minutes may be useful for producing products. Desorption times of 5 to 30 minutes may be used to produce products. Plug temperatures may be varied from −5 C to 90 Celsius, and different materials may result in different cup wall thickness distributions. Cooler mold temperatures down to 0 Celsius may allow more rapid processing, although less foaming will be induced.

While the detailed description above has been expressed in terms of specific examples, those skilled in the art will appreciate that many other configurations could be used.

Accordingly, it will be appreciated that various equivalent modifications of the above-described embodiments may be made without departing from the spirit and scope of the invention.

The foregoing description of various embodiments of the invention has been presented for the purposes of illustration and description. It is not intended to be exhaustive or to limit the invention to the precise form disclosed. It is intended that the scope of the invention be limited not by this detailed description, but rather by the claims appended hereto. The above specification, examples and data provide a complete description of the manufacture and use of the invention. Since many embodiments of the invention can be made without departing from the spirit and scope of the invention, the invention resides in the claims hereinafter appended.

The invention claimed is:

1. A method of creating a saturated thermoplastic sheet, the method comprising:
    exposing a surface of a Polylactic Acid sheet to a high pressure inert gas foaming agent in a pressure vessel to allow the Polylactic Acid sheet to absorb the foaming agent; and
    transferring water to the pressure vessel while the surface of the Polylactic Acid sheet is absorbing the high pressure inert gas foaming agent,
    wherein absorption of the high pressure inert gas foaming agent at least partially saturates the Polylactic Acid sheet with the inert gas foaming agent, and
    wherein exposing the Polylactic Acid sheet to the water induces a change in the surface of the Polylactic Acid sheet.

2. The method of claim 1, wherein the high pressure inert gas foaming agent is carbon dioxide.

3. The method of claim 1, wherein the Polylactic Acid sheet is semi-crystalline.

4. The method of claim 1, wherein the pressure vessel is maintained at a pressure from 400 psi to 1000 psi during the exposing.

5. The method of claim 1, wherein the Polylactic Acid sheet is in a solid state during the exposing.

6. The method of claim 1, wherein the change induced in the surface of the Polylactic Acid sheet occurs when the Polylactic Acid sheet is heated.

7. The method of claim 1, wherein the Polylactic Acid sheet is exposed to the high pressure inert gas foaming agent for less than 45 minutes.

8. A method of creating a partially saturated thermoplastic sheet, the method comprising:
   exposing a surface of a Polylactic Acid sheet to a high pressure inert gas foaming agent in a pressure vessel to allow the Polylactic Acid sheet to absorb the foaming agent; and
   transferring water to the pressure vessel while the surface of the Polylactic Acid sheet is absorbing the high pressure inert gas foaming agent,
   wherein absorption of the high pressure inert gas foaming agent only partially saturates the Polylactic Acid sheet with the inert gas foaming agent.

9. The method of claim 8, wherein the high pressure inert gas foaming agent is carbon dioxide.

10. The method of claim 8, wherein the Polylactic Acid sheet is semi-crystalline.

11. The method of claim 8, wherein the pressure vessel is maintained at a pressure of from 400 psi to 1000 psi during the exposing.

12. The method of claim 8, wherein the Polylactic Acid sheet is in a solid state during the exposing.

13. The method of claim 8, further comprising:
   heating the Polylactic Acid sheet to induce foaming of the Polylactic Acid sheet.

14. The method of claim 8, wherein the Polylactic Acid sheet is exposed to the high pressure inert gas foaming agent for less than 45 minutes.

15. The method of claim 1, wherein a first portion of the Polylactic Acid sheet has a first gas concentration after being exposed to the high pressure inert gas foaming agent, and a second portion of the Polylactic Acid sheet has a second gas concentration after being exposed to the high pressure inert gas foaming agent, the second gas concentration different from the first gas concentration.

16. The method of claim 1, wherein the Polylactic Acid sheet is only partially saturated after being exposed to the high pressure inert gas foaming agent.

17. The method of claim 1, further comprising:
   disposing the Polylactic Acid sheet in the pressure vessel; and
   transferring the inert gas foaming agent to the pressure vessel until a pressure of at least 400 psi is reached.

18. The method of claim 17, wherein the inert gas foaming agent is passed through a membrane prior to being transferred to the pressure vessel.

19. The method of claim 17, wherein the inert gas foaming agent passes by a nozzle ejecting the water prior to being transferred to the pressure vessel.

20. The method of claim 1, wherein the water transferred to the pressure vessel is water vapor.

21. The method of claim 8, wherein a first portion of the Polylactic Acid sheet has a first gas concentration after being exposed to the high pressure inert gas foaming agent, and a second portion of the Polylactic Acid sheet has a second gas concentration after being exposed to the high pressure inert gas foaming agent, the second gas concentration different from the first gas concentration.

22. The method of claim 8, further comprising:
   disposing the Polylactic Acid sheet in the pressure vessel; and
   transferring the inert gas foaming agent to the pressure vessel until a pressure of at least 400 psi is reached.

23. The method of claim 22, wherein the inert gas foaming agent is passed through a membrane prior to being transferred to the pressure vessel.

24. The method of claim 22, wherein the inert gas foaming agent passes by a nozzle ejecting the water prior to being transferred to the pressure vessel.

25. The method of claim 8, wherein the water transferred to the pressure vessel is water vapor.

26. A method of foaming a Polylactic Acid sheet, the method comprising:
   introducing the Polylactic Acid sheet in a pressure vessel;
   pressurizing the pressure vessel containing the Polylactic Acid sheet with an inert gas foaming agent, the inert gas foaming agent including carbon dioxide;
   allowing the Polylactic Acid sheet to at least partially absorb the carbon dioxide;
   transferring water into the pressure vessel while the Polylactic Acid sheet is absorbing the carbon dioxide;
   removing the Polylactic Acid sheet from the pressure vessel; and
   heating the Polylactic Acid sheet to induce foaming of the Polylactic Acid sheet.

27. The method of claim 26, wherein the Polylactic Acid sheet is in a solid state within the pressure vessel.

28. The method of claim 26, wherein heating the Polylactic Acid sheet includes heating a single side of the Polylactic Acid sheet.

29. The method of claim 26, further comprising:
   maintaining a pressure within the pressure vessel from 400 psi to 1000 psi.

30. The method of claim 29, wherein the pressure vessel is pressurized with the inert gas foaming agent for less than 45 minutes.

31. The method of claim 26, wherein the water transferred to the pressure vessel is a vapor.

32. The method of claim 26, further comprising:
   passing the inert gas foaming agent through a membrane prior to being transferred to the pressure vessel.

33. The method of claim 6, wherein the Polylactic Acid sheet is heated at atmospheric pressure.

34. The method of claim 13, wherein heating the Polylactic Acid sheet is performed at atmospheric pressure.

35. The method of claim 26, wherein heating the Polylactic Acid sheet is performed at atmospheric pressure.

* * * * *